United States Patent [19]

Larsson

[11] Patent Number: 5,445,197
[45] Date of Patent: Aug. 29, 1995

[54] ARRANGEMENT IN TREE-PROCESSING ASSEMBLY

[76] Inventor: Sune Larsson, S-822 91 Malvik 61, Alfta, Sweden

[21] Appl. No.: 107,682
[22] PCT Filed: Feb. 5, 1992
[86] PCT No.: PCT/SE92/00067
 § 371 Date: Nov. 29, 1993
 § 102(e) Date: Nov. 29, 1993
[87] PCT Pub. No.: WO92/14352
 PCT Pub. Date: Sep. 3, 1992

[30] Foreign Application Priority Data
 Feb. 21, 1991 [SE] Sweden ............... 9100512

[51] Int. Cl.6 ........................ A01G 23/08
[52] U.S. Cl. .................. 144/34 R; 30/379.5; 83/928; 144/3 D; 144/336
[58] Field of Search ............. 144/2 Z, 3 D, 34 R, 144/34 E, 335, 336; 83/928; 30/379, 379.5; 56/15.2, 233, 237, 255, 290, 295, 320.1

[56] References Cited
U.S. PATENT DOCUMENTS

| | | | |
|---|---|---|---|
| 2,667,902 | 2/1954 | Whiteside | 83/928 |
| 2,668,566 | 2/1954 | Goodlet | 83/928 |
| 3,343,575 | 9/1967 | Trout | 83/928 |
| 3,389,728 | 6/1968 | Gales | 144/34 R |
| 3,461,928 | 8/1969 | Siiro | 144/34 R |
| 3,542,099 | 11/1970 | Gibson | 144/34 R |
| 4,326,570 | 4/1982 | Fridley et al. | 30/379.5 |
| 4,960,157 | 10/1990 | Sheets | |
| 5,201,350 | 4/1993 | Milbourn | 83/928 |
| 5,291,926 | 3/1994 | Jansson | 83/928 |

FOREIGN PATENT DOCUMENTS 8902670 8/1989 Sweden.
WO87/05184 11/1987 WIPO.

Primary Examiner—W. Donald Bray

[57] ABSTRACT

The present invention relates to an arrangement in a tree-processing assembly of the type comprising a frame base (2) which is connectible to the tip of a crane via a rotator (3) and with which a pivotable carrier (5) is hingedly connected, said carrier comprising at least one set of grapples (6, 6', 6") for gripping and holding a log, and a cutting tool, such as a chain-saw guide bar (12), attached to the lower part (11) of the carrier. On the lower part (11) of the carrier (5) there is mounted a rotary saw blade (15) which is pivotably movable between an inactive position in which it is swung in towards the carrier, and an active position in which it is swung out from the carrier and in which it can cut, by means of an outer half, a shrub layer and/or small trees.

7 Claims, 2 Drawing Sheets

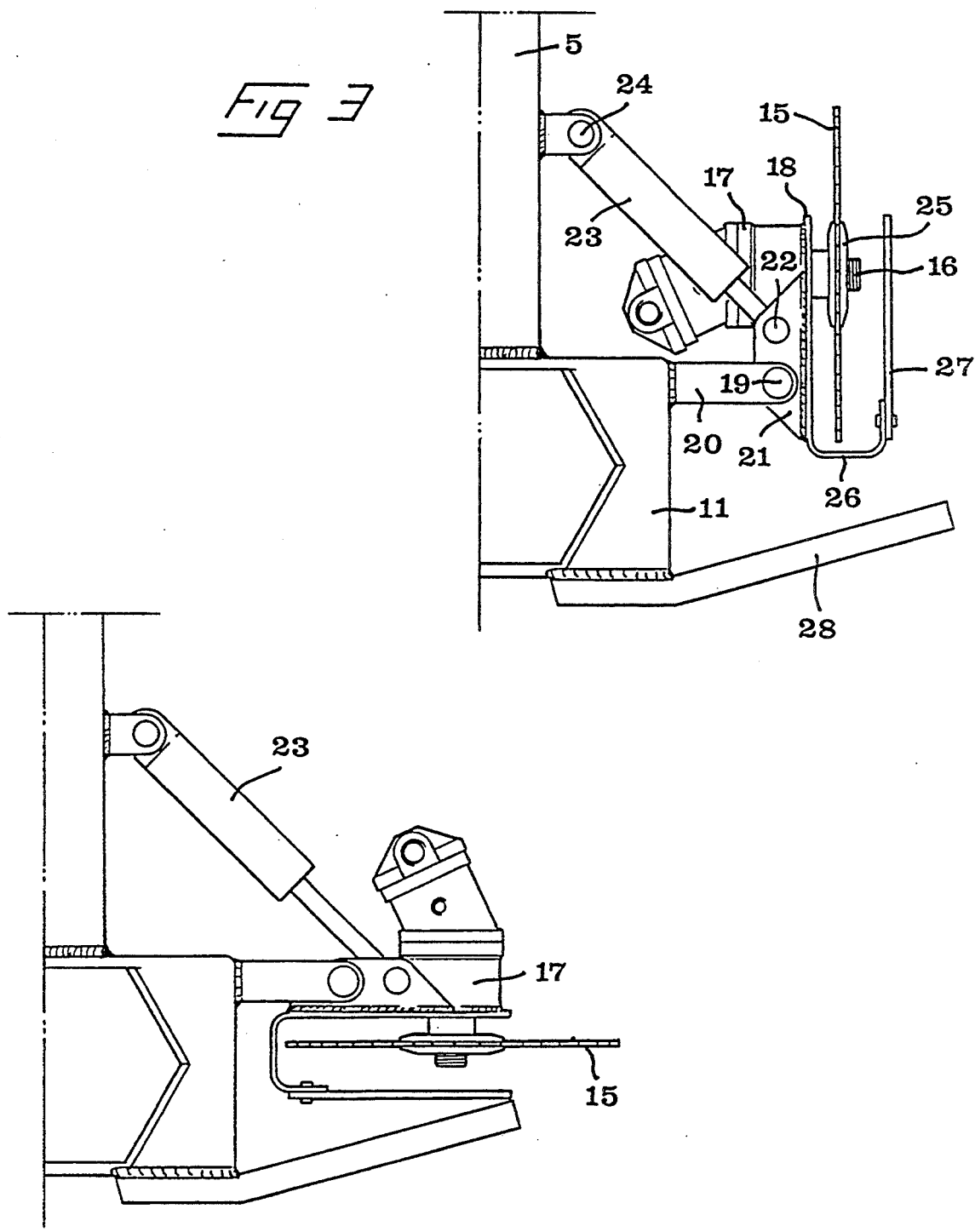

ARRANGEMENT IN TREE-PROCESSING ASSEMBLY

FIELD OF THE INVENTION

The present invention relates to an arrangement in a tree-processing assembly of the type comprising a frame which is connectible to the tip of a crane via a rotator and with which a pivotable carrier is hingedly connected, said carrier comprising at least one set of grapples for gripping and holding a log, and a cutting tool, such as a chain-saw guide bar, attached to a lower part of said carrier.

Such tree-processing assemblies can be divided into two different basic types, e.g. so-called "harvesters" and "pure felling" assemblies. A one-grip type harvester comprises, in addition to grapples and a cutting tool, a number of limbing knives and at least one set of feed rolls by means of which the felled tree held by the grapples, can be longitudinally fed relative to the carrier and thus be separated from the limbs. By means of such harvesters, a tree can thus be felled, delimbed and cut to suitable lengths. However, in conventional felling assemblies, there are, no feed rolls, and therefore such assemblies can only cut the tree at the root, without delimbing it.

BACKGROUND OF THE INVENTION

In modern forestry, tree stands are in most cases thinned by means of e.g. "one-grip" harvesters. A frequent problem in such thinning is caused by the thicket or shrub layer which is often found adjacent the trees which are to be thinned and cut. Such thicket normally grows around the lower part of the tree to be cut, thus preventing a clear view by the person who operates the harvester from a driving-cab located a considerable distance from the tree. Besides blocking the operator's view, the thicket also causes problems by easily finding its way between the the trunk and the saw chain mounted on the guide bar of the harvester, which serves as a cutting tool. As a result, the chain may slip or jam and, consequently, lose its capacity of effectively cutting the trunk. To eliminate the problems caused by thicket surrounding the tree, in practice there is usually a special operator who manually cleans the tree stand from the shrub layer by means of a conventional bush saw, before the actual thinning is carried out. However, this work is costly and involves a number of drawbacks. One drawback is that the cleaning operator does not know in advance which direction the harvester will be moving towards the tree to be thinned. Thus the operator must remove all the thicket in a 360° sector around the tree. Removing substantially all the thicket in this manner while leaving completely bare surfaces around the tree is contrary to recent environmental protection practices which recommend a certain amount of shrub layer in a growing forest, to create a favourable environment for forest animals. Such clear-cleaning involves extensive work which takes much time and thus is expensive. In practice, the cost for manual thicket-cleaning alone is estimated at 15-20% of the total thinning cost. A further problem relates to the technical planning, particularly for large forest owners with a large number of scattered stands. Thus, it is extremely difficult to plan the cleaning operator's work to coordinate efficiently with the thinning operation.

BRIEF DESCRIPTION OF THE INVENTION

The present invention aims at overcoming the above-mentioned drawbacks by eliminating the need for manual cleaning and for permitting the removal, as required, of thicket and shrub layer which may be obstructing the thinning operation. According to the invention, this is achieved by providing on the lower part of the carrier of a tree-processing assembly of the above-mentioned type, there is mounted a rotary saw blade which is pivotably movable between an inactive position and an active position in which it can cut shrub layers and/or small trees.

According to a preferred embodiment of the invention, the saw blade is dismountably arranged on a shaft which is rotatably mounted and connected to a hydraulic motor, which in turn, is arranged on a support member. The support member may be a plate, which in turn is articulated to the lower part of the carrier. In turn, a hydraulic cylinder extends between the support member and the carrier, the support member and, thus, the saw blade being pivotable by means of the hydraulic cylinder between a substantially vertical, swung-in position and a substantially horizontal, swung-out position.

BRIEF DESCRIPTION OF THE ACCOMPANYING DRAWINGS

In the drawings

FIG. 1 is a schematic, simplified front view of a "one-grip" type harvester with a cleaning arrangement according to the invention, FIG. 2 is a perspective view of a cleaning arrangement according to the invention, and FIGS. 3 and 4 are enlarged side views of the cleaning arrangement according to FIG. 2, in two different positions.

DETAILED DESCRIPTION OF A PREFERRED EMBODIMENT OF THE INVENTION

Figure 1:
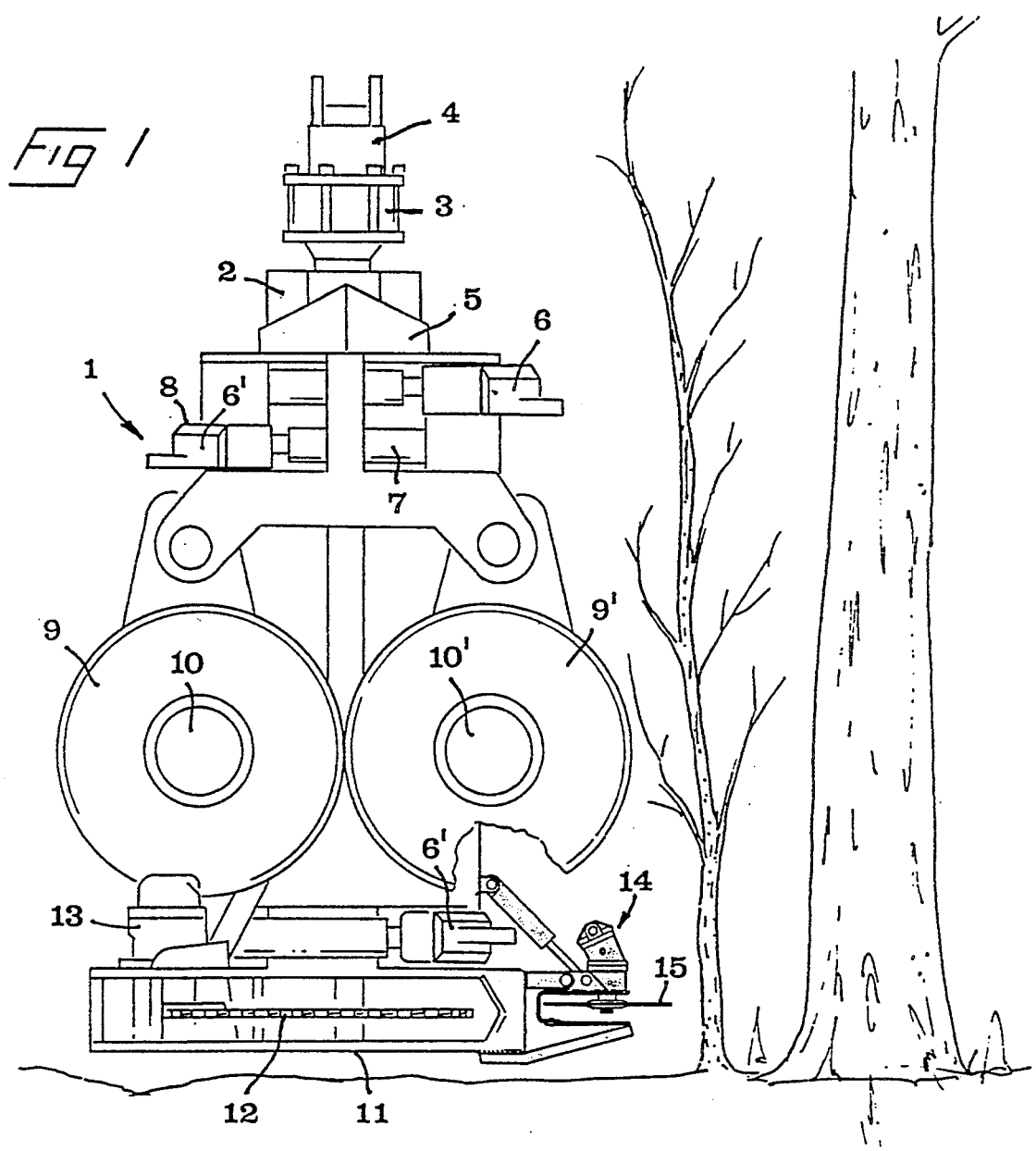

In FIG. 1, a "one-grip" type harvester is generally designated 1. The harvester comprised, in a conventional manner, a frame 2 which, via a rotator 3, is connected to a mounting 4 which in turn can be attached to the tip of a crane mounted on an off-road vehicle. The frame 2 is via a hinge (not shown) connected to a carrier which in its entirety is designated 5 and which in FIG. 1 is shown to be positioned in a substantially vertical position. By means of a hydraulic cylinder (not shown) acting between the frame 2 and the carrier 5, the carrier can be pivoted from the vertical position shown in the drawings, to a substantially horizontal position in which the carrier is swung forwards, when viewed from the plane of the drawing. The carrier 5 supports a number of grapples 6, 6', 6" which are each pivotable by means of a respective hydraulic cylinder 7 with each having a limbing knives 8. Knives 8 have obliquely ground surfaces forming cutting edges by means of which a passing log can be delimbed. The carrier 5 supports two feed rolls 9, 9' which are pivotable towards and away from each other. The feed rolls, which are rotatable by means of built-in hydraulic motors 10, 10', serve to press against a cut log received by the grapples, and to move the log axially relative to the carrier for delimbing thereof. In a lower box-shaped member 11 of the carrier 5, a cutting tool in the form of a chain-saw guide bar 12 is provided. The chain can be moved by means of a hydraulic motor 13, the guide bar itself being pivotable between an inactive position in the box-shaped member 11 and an active position swung out from the box.

The arrangement described above is essentially conventional in all material aspects.

According to the invention, a cleaning assembly designated in its entirety by 14 is connected to the lower member 11 of the harvester 1 and in particular, to the carrier 5. The characteristic features of this cleaning arrangement are shown in greater detail in FIGS. 2–4, to which reference is now made.

The active operating component in the assembly 14 is a rotatable, toothed saw blade 15 preferably of a conventional type. It is dismountably arranged on a shaft which can be the output shaft of a hydraulic motor 17, the latter being mounted on a supporting plate 18. This is, in turn, articulated in association with the lower part of the carrier via hinges 19 arranged at the outer end of brackets 20 extending from the lower member 11. To the upper side of the supporting plate 18 there is attached a mounting 21 for a hinge 22 of a hydraulic cylinder 23, whose opposite end is articulated to the carrier 5 via a hinge 24. In the embodiment shown, the piston rod of the hydraulic cylinder is connected to the hinge 22, while the cylinder itself is connected to the hinge 24 associated with the carrier 5. The dismountable arrangement of the saw blade 15 on the shaft 16 can advantageously be achieved by using two supporting discs 25 with internally threaded holes, and by using screwed to an externally threaded portion of the shaft 16. A worn-out saw blade may thus be easily and quickly removed from the shaft, by unscrewing the outer supporting disc, and replacably by a new saw blade.

The supporting plate 18 connected with a base plate 27 by an inner cross-member 26. The base plate 27 is spaced from the supporting plate and the inner half of the saw blade is accommodated in the space formed between the plates 18 and 27. As a result, the saw blade is well protected while in its inactive, swung-in position shown in FIG. 3. In the area below the saw blade there is further arranged a yoke 28 which projects from the lower edge of the lower member 11 of the carrier. As is evident from FIG. 3, the yoke 28 projects a distance beyond the base plate 27 of the saw blade holder so that the saw blade and its holder, in the inactive position illustrated, are reliably protected against mechanical damage caused by hard objects, such as stones, stumps and thick trees. Also, in the active position illustrated in FIG. 4, the yoke 28 protects the saw blade holder from mechanical damage as the outer end of the yoke is in positioned approximately the same vertical plane as the outer parts of the saw blade holder, only a portion of the saw blade projects beyond this plane.

Although the yoke 28 is shown as being inclined in the drawings, it may also be entirely straight, extending from the bottom side of the lower member 11. Such a straight design would also allow the same blade to be slightly lowered by arranging the brackets 20 lower down on the outside of the lower member 11.

Figure 2:
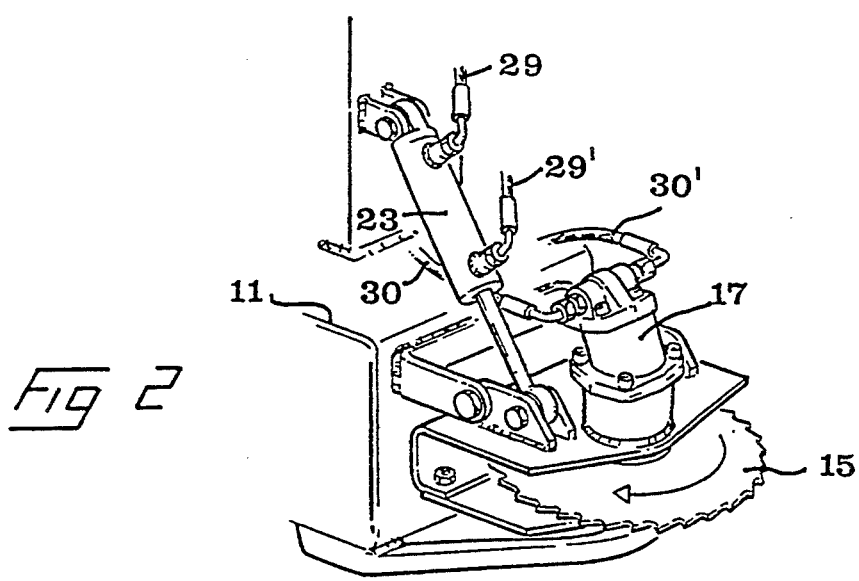

As shown in FIG. 2, the hydraulic cylinder 23 is a double-acting cylinder and is fitted with suitable hydraulic lines 29, 29'. The hydraulic motor 17 is supplied with hydraulic fluid via lines 30, 30'. It is per se conceivable to control the hydraulic motor 17 and the hydraulic cylinder 23 separately by rotating the saw blade independently of whether the hydraulic cylinder is activated or not. In practice, it is preferred to synchronize the operation of the hydraulic motor with the operation of the hydraulic cylinder in such a manner that the starting of the saw blade 15 is automatically accompanied by activation of the positive chamber of the hydraulic cylinder, i.e. the saw blade, once it has been caused to rotate, is swung out. Inversely, once the saw blade stops rotating, the saw blade can be swung back to its inactive position. Such synchronisation can be carried out by suitably integrating the above-mentioned lines into the existing system of hydraulic lines that is required for the other components of the harvester.

The above-described arrangement operates in the manner described below. When the harvester 1 is moved against the tree selected to be cut, which tree is surrounded by a shrub layer blocking the operator's view, the saw blade 15 is swung out to the active position shown in FIG. 1. In this position, the saw blade can be quickly moved forwards to individual shrubs and small trees by moving the tip of the crane and rotating the entire harvester via the rotator 3, the shrubs and small trees being cut as soon as the rotating saw blade comes into contact with them. It is, of course, sufficient to remove only the vegetation in a limited sector (e.g. 90°–120°) in the area in front of the tree to be thinned and leave the remaining vegetation surrounding the tree. Such cleaning can in practice be carried out very quickly, for example in 10–20 s. After the thinning operation has been completed, the saw blade is stopped and swung into the position shown in FIG. 3, whereupon the harvester, which is unobstructed, can smoothly and effectively grasp the tree and process it in the usual manner, i.e. fell, delimb and cut it to suitable lengths.

The advantages of the invention are obvious. According to the present invention, the need for costly manual cleaning is eliminated, and thus, that the planning of the thinning operation is facilitated to a considerable extent. Moreover, there is no need for completely cleaning the area surrounding a tree because the direction that the harvester will be moving towards the tree is already determined when the cleaning assembly according to the invention, is activated. The result is that only a limited sector in front of the tree requires cleaning.

POSSIBLE MODIFICATIONS OF THE INVENTION

The invention is not restricted only to the embodiment described above and shown in the drawings. The saw blade included in the arrangement can also be mounted on other types of holders other than the one illustrated in the drawings. Furthermore, the saw blade can be swung between its two positions in ways other than by means of a hydraulic cylinder, although, in practice, a hydraulic cylinder is preferred. Additionally, the cleaning saw blade can be mounted on an arm which is pivotable relative to the carrier in a horizontal plane, instead of in a vertical plane, and more particularly between an active front position and an inactive rear position, instead of a swung-out and a swung-in position as illustrated in the drawings. It is also possible to apply the invention to other types of tree-processing assemblies, other than a "one-grip" type harvester, such as "pure felling" assemblies and "two-grip" type harvesters.

I claim:

1. In a tree-processing assembly comprising a frame (2), a rotator (3), and wherein said frame is connectable to a tip of a crane by said rotator, a pivoted carrier (5) hingedly connected to said frame, said carrier having at least one set of grapple means (6,6'6") for gripping and holding a log, and a cutting tool (12) attached to a lower part (11) of said carrier, the improvement wherein a rotary saw blade (15) is mounted on said lower part (11) of said carrier (5), said rotary saw blade (15) being pivotally mounted for movement between an inactive position and an active position in which said rotary saw blade (15) can cut material.

2. An assembly as claimed in claim 1, wherein said rotary saw blade (15) is dismountably mounted on a shaft (16), said shaft (16) being rotatably mounted, a hydraulic motor (17) connected to said shaft (16), said hydraulic motor mounted on a support member (18), said support member (18) being pivotally mounted on said lower part (11) of said carrier (5), and an hydraulic cylinder (23) extending between said support member (18) and said carrier (5), said support member (18) and said saw blade (15) being pivotal between a substantially vertical, inactive, position and a substantially horizontal, active, position.

3. An assembly as claimed in claim 2, wherein there is provided a base plate (27), and an inner cross member (26), said inner cross member connecting said base plate (27) to said support member (18) in a spaced relationship thereto, at least an inner half of said rotary saw blade (15) being located between said support member (18) and said base plate (27).

4. An assembly as claimed in claim 2, including a yolk (28), said yolk projecting from a lower edge of said lower part (11) of said carrier (5), said yolk further projecting below said rotary saw blade (15) to protect said rotary saw blade (15) and associated components from contact with external material when said rotary saw blade (15) is in an inactive position.

5. An assembly as claimed in claim 1, wherein said cutting tool (12) comprises a chain saw.

6. An assembly as claimed in claim 2, wherein said support member is a plate.

7. An assembly as claimed in claim 1, wherein said cutting tool includes a chain-saw guide bar.

* * * * *